US 7,849,697 B2

(12) United States Patent
Sung

(10) Patent No.: US 7,849,697 B2
(45) Date of Patent: Dec. 14, 2010

(54) AIR-CONDITIONING APPARATUS USING THERMOELECTRIC DEVICE

(75) Inventor: Nak Sup Sung, Hwaseong-si (KR)

(73) Assignees: Hyundai Motor Company, Seoul (KR); Kia Motors Corporation, Seoul (KR); Halla Climate Control Corp., Daejeon (KR)

( * ) Notice: Subject to any disclaimer, the term of this patent is extended or adjusted under 35 U.S.C. 154(b) by 423 days.

(21) Appl. No.: 12/117,558

(22) Filed: May 8, 2008

(65) Prior Publication Data

US 2008/0209913 A1    Sep. 4, 2008

(30) Foreign Application Priority Data

Dec. 12, 2007   (KR) .................. 10-2007-0129254

(51) Int. Cl.
*F25B 21/02*   (2006.01)
(52) U.S. Cl. .................. 62/3.3; 62/179; 62/244
(58) Field of Classification Search .......... 62/3.3, 62/126, 129, 185, 118, 324.6, 179, 244; 165/80.4, 165/80.3, 201, 245; 137/2, 334
See application file for complete search history.

(56) References Cited

U.S. PATENT DOCUMENTS 4,930,317 A * 6/1990 Klein ..................... 62/3.3
5,555,579 A * 9/1996 Wu ....................... 5/421
6,006,524 A * 12/1999 Park ..................... 62/3.7
6,182,454 B1 * 2/2001 McNeilan ............... 62/176.4
6,298,669 B1 * 10/2001 Maruyama et al. ........ 62/3.2
6,567,262 B2 * 5/2003 Meir ..................... 361/676

FOREIGN PATENT DOCUMENTS

KR    10-2007-0077546 A    7/2007

* cited by examiner

*Primary Examiner*—Mohammad M Ali
(74) *Attorney, Agent, or Firm*—Morgan, Lewis & Bockius LLP

(57) ABSTRACT

An air conditioner includes a thermoelectric device, and a first line with a first fluid therein. The first line is configured such that the first fluid can exchange heat with a first surface of the thermoelectric device, and configured to discharge the fluid to a space. A second line has a second fluid therein. The second line is configured such that the second fluid can exchange heat with a second surface of the thermoelectric device, and pass through a heat sink to further exchange heat. A control unit supplies electricity to the thermoelectric device such that the first surface absorbs heat in a cooling mode and the second surface absorbs heat in a heating mode. The control unit also controls a flow rate of the second fluid, such that the flow rate is higher in the cooling mode than in the heating mode.

11 Claims, 3 Drawing Sheets

AIR-CONDITIONING APPARATUS USING THERMOELECTRIC DEVICE

CROSS-REFERENCE TO RELATED APPLICATIONS

This application claims priority to Korean Application No. 10-2007-0129254, filed on Dec. 12, 2007, the disclosure of which is incorporated herein by reference.

BACKGROUND OF THE INVENTION

1. Field of the Invention

The present invention relates to an air-conditioning apparatus using a thermoelectric device.

2. Description of the Related Art

Recently, air-conditioning apparatuses that use thermoelectric devices have been developed. A thermoelectric device (TED) has one surface that generates heat, and one surface that absorbs heat, when electricity is supplied to the device. An air-conditioning apparatus using a TED includes a heat exchanger on each surface of the TED, and air is supplied to one of the heat exchangers using a blower, thus providing hot or cool air.

This air conditioner is inefficient, because, even though the quantity of heat generated at the heat generating surface of the thermoelectric device is larger than the quantity of heat absorbed at the heat absorbing surface, the same flow rate of air is supplied to both surfaces. Thus, more air than necessary is supplied to the heat absorbing surface. As a result, the performance of the thermoelectric device is not fully utilized.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An air conditioner includes a thermoelectric device, and a first line with a first fluid therein. The first line is configured such that the first fluid can exchange heat with a first surface of the thermoelectric device, and configured to discharge the fluid to a space. A second line has a second fluid therein. The second line is configured such that the second fluid can exchange heat with a second surface of the thermoelectric device, and pass through a heat sink to further exchange heat. A control unit supplies electricity to the thermoelectric device such that the first surface absorbs heat in a cooling mode and the second surface absorbs heat in a heating mode. The control unit also controls a flow rate of the second fluid, such that the flow rate is higher in the cooling mode than in the heating mode.

The control unit may also control a fan provided at the heat sink, such that the fan cools the heat sink more in the cooling mode than in the heating mode. The control unit may also control a flow rate of the first fluid, such that the first fluid flow rate is higher in the heating mode than in the cooling mode.

The second fluid may be a liquid coolant, such as water. The second line may be connected to a pump and configured to allow the second fluid to circulate between the thermoelectric device and the pump.

The first fluid may be a gaseous coolant, such as air. The space to which the first fluid is discharged may be a vehicle passenger compartment. The heat sink may be a vehicle radiator.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DESCRIPTION OF THE PREFERRED EMBODIMENTS

Hereinafter, an air-conditioning apparatus using a thermoelectric device according to the preferred embodiment of the present invention will be described with reference to the accompanying drawings.

Figure 1:
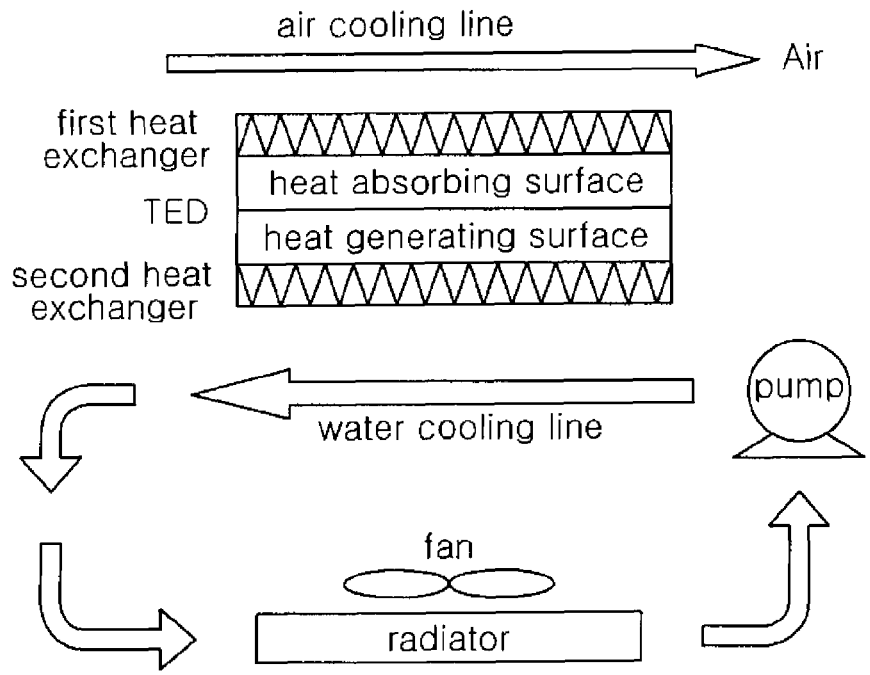
FIG. 1 is a schematic view of an exemplary air-conditioning apparatus in a cooling mode.
Figure 2:
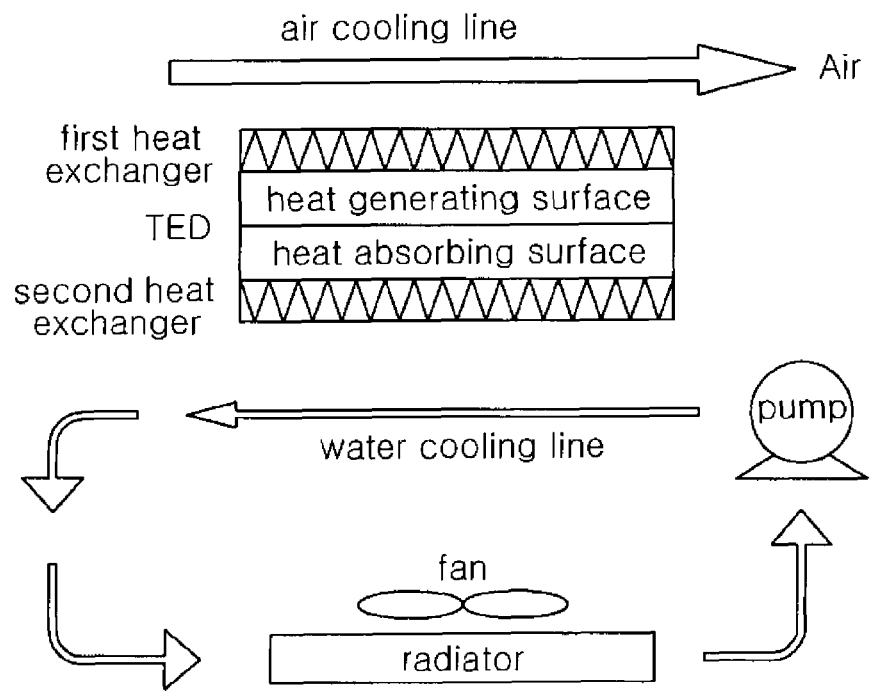
FIG. 2 is a schematic view of an exemplary air-conditioning apparatus in a heating mode.
Figure 4:
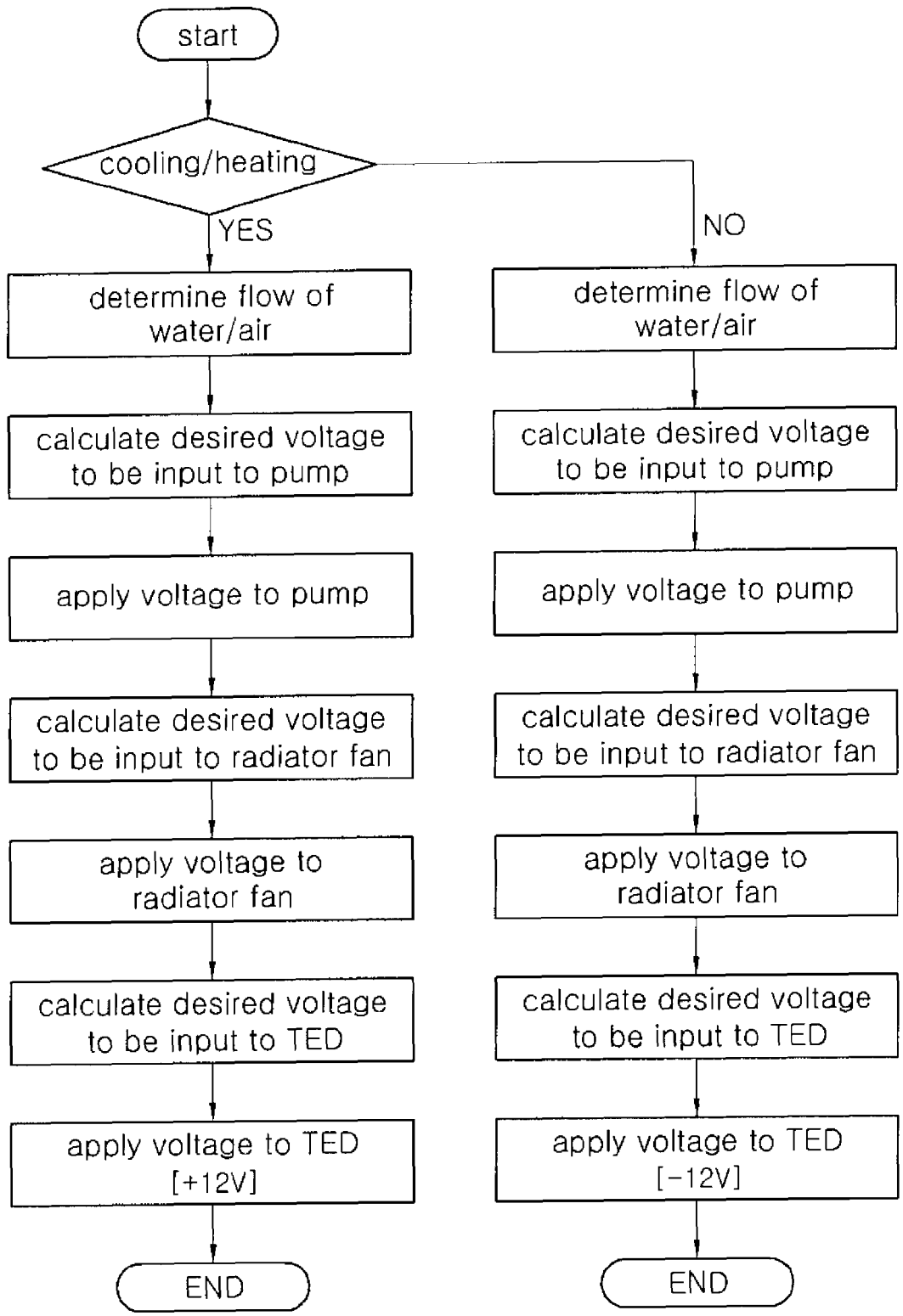
FIG. 4 is a flowchart illustrating the control logic of an exemplary air-conditioning apparatus.

As shown in FIGS. 1 and 2, an exemplary air-conditioning apparatus includes a thermoelectric device (TED), an air cooling line, a water cooling line, and a control unit (FIG. 4).

A first heat exchanger is provided on one surface of the thermoelectric device. Air flow in the air cooling line exchanges heat with the TED in the first heat exchanger, prior to being discharged to a passenger compartment of a vehicle so as to air-condition the vehicle. The air may be propelled by a blower in a manner that can be designed and implemented by a person of ordinary skill in the art based on the teachings herein.

A second heat exchanger is provided on the other surface of the thermoelectric device. Water flowing in the water cooling line exchanges heat with the TED in the second heat exchanger, and thereafter passes through a radiator, while circulating in the water cooling line. The water may be circulated in the water cooling line by a pump in a manner that can be designed and implemented by a person of ordinary skill in the art based on the teachings herein. A fan may be mounted to the radiator to discharge heat. When the vehicle is moving, operation of the fan may not be required.

The control unit (FIG. 4) selectively supplies electricity to the thermoelectric device and changes the polarity of the electricity such that one surface of the thermoelectric device absorbs heat in a cooling mode, and the other surface absorbs heat in a heating mode (compare the surfaces in FIGS. 1 and 2). Further, the control unit controls voltage input to the pump such that the flow of the water cooling line in the cooling mode is larger than that in the heating mode, and/or increases voltage to be input to the fan, thus increasing the efficiency of the thermoelectric device. Further, the control unit controls the flow in the air cooling line such that it is greater in the heating mode than in the cooling mode.

The correlation between the increase in flow and the efficiency of the thermoelectric device will be described with reference to FIG. 3.

Figure 3:
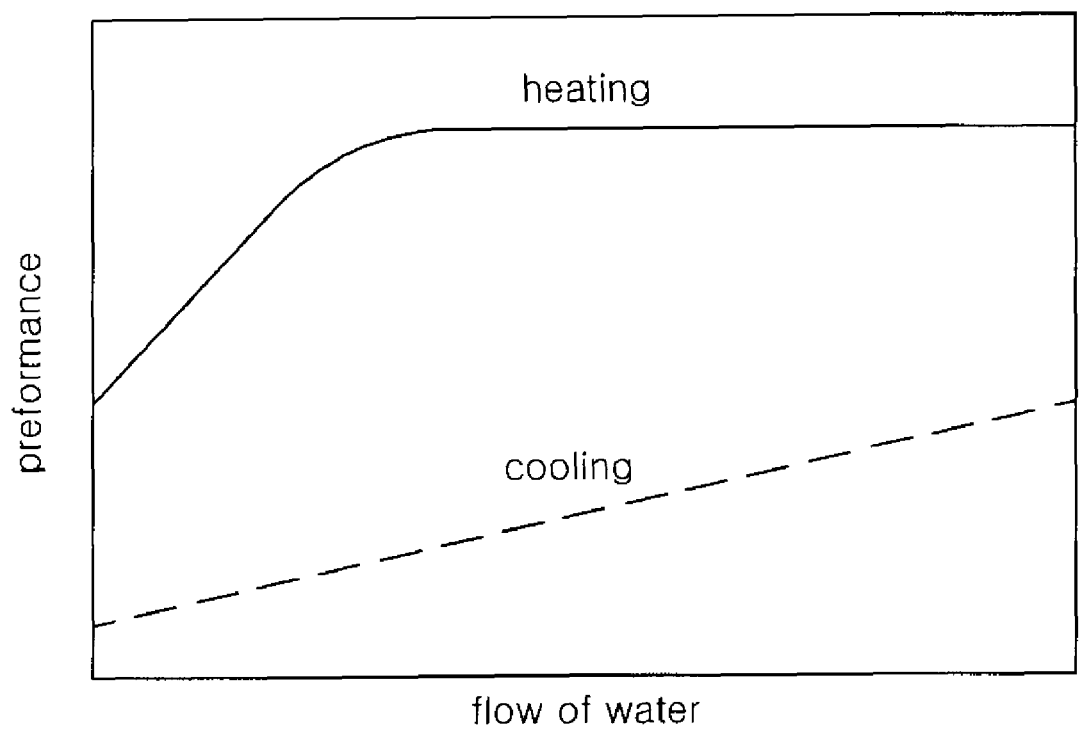
FIG. 3 is a graph showing the performance of an exemplary device as a function of the flow rate of water.

As shown in FIG. 3, as the flow in the water cooling line increases in the cooling mode, the efficiency of the thermoelectric device increases linearly. Conversely, when the flow in the water cooling line increases in the heating mode, the efficiency of the thermoelectric device increases abruptly at low flow rates, but when the flow of water exceeds a threshold value, the increase in the flow of water scarcely affects the increase in the efficiency of the thermoelectric device. This is due to the properties of the thermoelectric device as will be understood by people of ordinary skill in the art. That is, since the quantity of heat generated by the thermoelectric device in the cooling mode is greater than that in the heating mode, cooling performance increases abruptly according to an increase in the flow of water. Conversely, the quantity of heat absorbed by the thermoelectric device in the heating mode is small, so that cooling performance increases abruptly even if the flow of water is relatively small.

Exemplary control logic of the air-conditioning apparatus will be described with reference to FIG. 4.

The control unit detects whether the air-conditioner is in a cooling mode or a heating mode, and determines the flow required for the air cooling line or the water cooling line accordingly, so that the appropriate flow of air or water is fed along each line. When the flow of water is determined in each mode, the control unit calculates the desired voltage to be input to the pump and fan, and applies the necessary voltages. Further, according to the air-conditioning mode and the required temperature, the polarity of electricity and the input voltage, which are to be supplied to both surfaces of the thermoelectric device, are calculated, so that the voltage is applied to the thermoelectric device. In the control logic, the flow of water/air which is to be supplied to the air-conditioning line or the water cooling line is determined as described above.

As described above, the exemplary apparatus efficiently utilizes the thermoelectric device for both cooling and heating modes.

Although the preferred embodiment of the present invention has been disclosed for illustrative purposes, those skilled in the art will appreciate that various modifications, additions and substitutions are possible, without departing from the scope and spirit of the invention as defined in the accompanying claims.

What is claimed is:

1. An air conditioner, comprising:
   a thermoelectric device;
   a first line configured such that a first fluid therein can exchange heat with a first surface of the thermoelectric device, and configured to discharge the first fluid to a space;
   a second line configured such that a second fluid therein can exchange heat with a second surface of the thermoelectric device, and pass through a heat sink to further exchange heat; and
   a control unit for supplying electricity to the thermoelectric device such that the first surface absorbs heat in a cooling mode and the second surface absorbs heat in a heating mode, and for controlling a flow rate of the second fluid, such that the flow rate is higher in the cooling mode than in the heating mode.

2. The air conditioner according to claim 1, wherein the control unit further controls a fan provided at the heat sink, such that the fan cools the heat sink more in the cooling mode than in the heating mode.

3. The air conditioner according to claim 1, wherein the control unit further controls a flow rate of the first fluid, such that the first fluid flow rate is higher in the heating mode than in the cooling mode.

4. The air conditioner according to claim 1, wherein the second fluid comprises a liquid coolant.

5. The air conditioner according to claim 4, wherein the second line is connected to a pump and configured to allow the second fluid to circulate between the thermoelectric device and the pump.

6. The air conditioner according to claim 4, wherein the second fluid comprises water.

7. The air conditioner according to claim 1, wherein the first fluid comprises a gaseous coolant.

8. The air conditioner according to claim 7, wherein the first fluid comprises air.

9. The air conditioner according to claim 1, where the space is a vehicle passenger compartment.

10. The air conditioner according to claim 1, wherein the heat sink comprises a vehicle radiator.

11. An air conditioner, comprising:
    a thermoelectric device;
    a first line configured such that air therein can exchange heat with a first surface of the thermoelectric device, and configured to discharge the air to a space;
    a second line configured such that water therein can exchange heat with a second surface of the thermoelectric device, and pass through a heat sink to further exchange heat; and
    a control unit for supplying electricity to the thermoelectric device such that the first surface absorbs heat in a cooling mode and the second surface absorbs heat in a heating mode, and for controlling a flow rate of the water, such that the flow rate is higher in the cooling mode than in the heating mode.

* * * * *